United States Patent [19]
Yanai et al.

[11] Patent Number: 6,088,542
[45] Date of Patent: Jul. 11, 2000

[54] HOUSING FOR CAMERA FLASH CONTROL COMPONENTS AND CIRCUITRY

[75] Inventors: Junichi Yanai, Chigasaki; Nobuyoshi Hagiuda, Yokohama, both of Japan

[73] Assignee: Nikon Corporation, Tokyo, Japan

[21] Appl. No.: 09/234,601

[22] Filed: Jan. 21, 1999

[30] Foreign Application Priority Data

Jan. 21, 1998 [JP] Japan .................................. 10-009541

[51] Int. Cl.[7] .................................................. G03B 15/05
[52] U.S. Cl. ............................ 396/155; 396/182; 362/16
[58] Field of Search ............................ 396/56, 155, 171, 396/182; 362/3, 4, 11, 16

[56] References Cited

U.S. PATENT DOCUMENTS

3,979,583  9/1976  McCan ....................................... 362/16
5,794,082  8/1998  Matsui et al. .............................. 396/56

Primary Examiner—W. B. Perkey
Attorney, Agent, or Firm—Erik B. Cherdak & Associates, LLC

[57] ABSTRACT

Flash unit for a camera includes a flash illumination device which illuminates during imaging operations of the camera, and a housing encasing the flash illumination device. The housing is made from a material that transmits infrared light emitted by the flash illumination device to an area outside of the housing. Also disclosed is a camera that includes a built-in flash unit that further includes a flash illumination device which illuminates during operations of the camera. The camera also includes a housing that encases the built-in flash illumination unit. The housing, like the housing of the flash unit, is made from a material that transmits infrared light emitted by the flash illumination device to an area outside of the housing. Also provided is a command module for use by a camera in controlling another device. The command module includes an infrared light source, and a housing that encases the infrared light source. The housing is made from a material that transmits infrared light emitted by the infrared light source to an area outside of the housing. The light emitted by the infrared light source and which is transmitted by the housing is used to control another device. The command module also includes a coupling member connected to the housing for coupling the housing to the camera. The coupling member permits the camera to control the infrared light source.

32 Claims, 11 Drawing Sheets

FIG. 7A  BCPS

MASTER STROBE LIGHT
EMISSION WAVEFORM

TIME

FIG. 7B  V

OUTPUT OF
AGC CIRCUIT

TIME

FIG. 7C  V

DIFFERENTIAL WAVEFORM OF
MASTER STROBE LIGHT EMISSION

TIME

FIG. 7D  V
H

OUTPUT OF LIGHT EMISSION
COMMENCEMENT DETECTION
CIRCUIT
L

TIME

FIG. 7E  V
H

OUTPUT OF LIGHT EMISSION
STOP DETECTION CIRCUIT
L

TIME

FIG. 7F  BCPS

OUTPUT WAVEFORM
OF SLAVE STROBE

TIME

HOUSING FOR CAMERA FLASH CONTROL COMPONENTS AND CIRCUITRY

BACKGROUND OF THE INVENTION

1. Field of the Invention

The present invention relates to flash and strobe units used with cameras and other imaging devices. More particularly, the present invention relates to housings for flash and strobe components and circuitry.

2. Description of the Related Art

Cameras having built-in flash units are well known. Their widespread popularity is due in large part to the ease of use associated with performing flash photography without having to mount a dedicated flash unit onto a camera or other imaging device.

Unfortunately, however, built-in flash units often do not provide sufficient additional lighting to support exposures of distant subjects, etc. For example, when a built-in flash unit emits light in a substantially singular direction (e.g., toward a subject), a shadow can result at the back of the subject which can adversely affect imaging (e.g., photographic, etc.) operations.

To address such problems, various proposals have been made which involve plural strobe/flash units to properly illuminate a scene or subject to be imaged. For example, some developers have proposed the use of master and slave strobe/flash units. With such an arrangement, light amount and duration are adjusted by simultaneousely stopping light emission by the master and slave units. In Japanese Laid-Open Patent Publication No. JP-A-57-88437, for example, light adjustment is achieved by providing two flash units which are connected to each other via a cable or other dedicated type of physical connection. Unfortunately, prior multi-flash unit systems like or similar to those illustrated in Japanese Publication No. JP-A-57-88437 were complicated to setup and took a relatively long period of time to arrange. Such problems hinder photographic and other imaging operations and, as a result, have been the cause of lost and poor-quality images.

To solve the aforementioned problems associated with prior multi-strobe systems used to achieve properly illuminated images, other developers have proposed using wireless technologies. Typically, such wireless systems use light or electric waves (RF) between a master strobe/flash unit and a slave strobe/flash unit to control the same to achieve a desired level of illumination. Such wireless systems go far to ease setup operations and to minimize the amount of time necessary to do the same. Unfortunately, however, prior wireless systems still do not permit reliable and predictable flash images and, in fact, are quite difficult to use.

Figure 1:
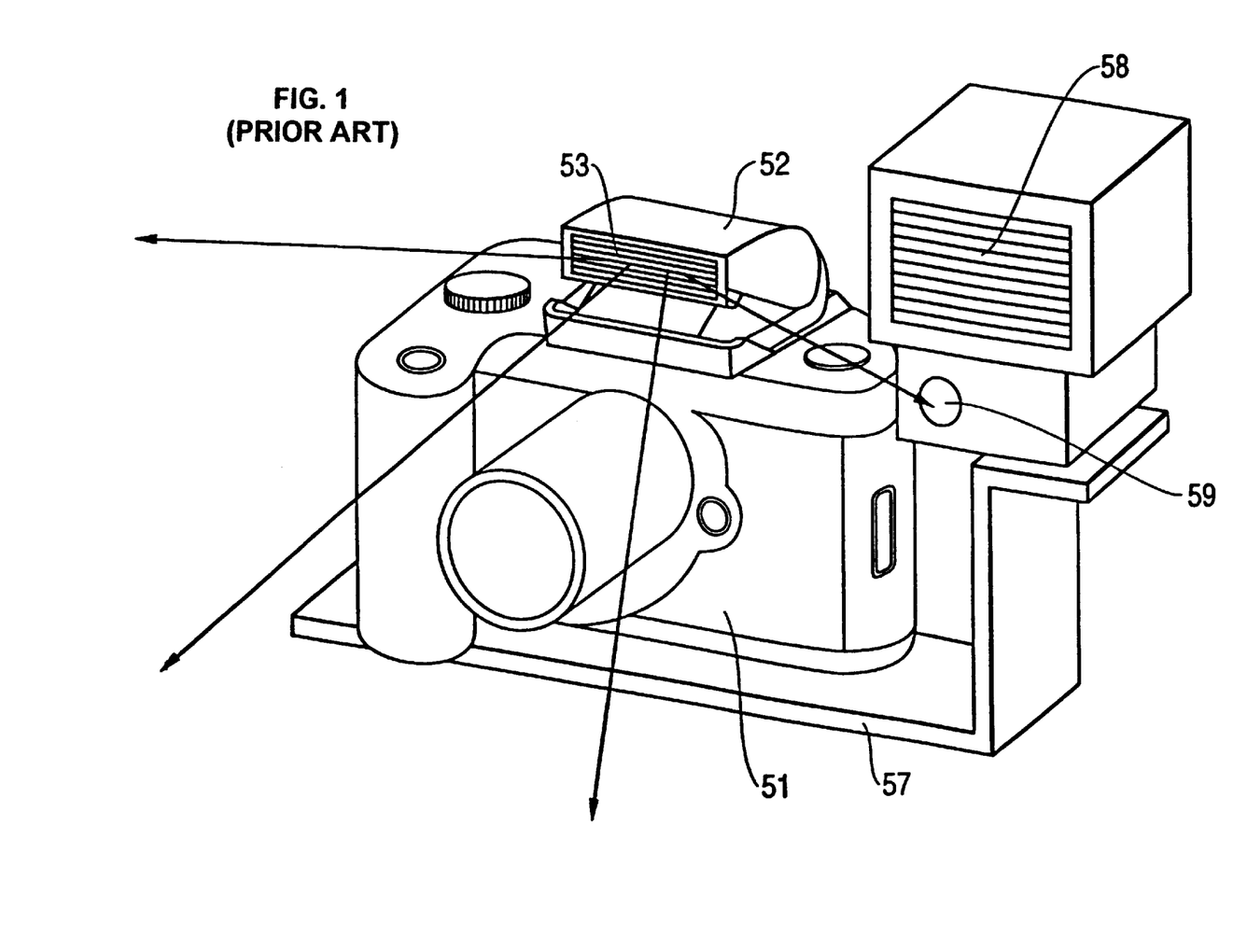
FIG. 1 is a diagram of a camera that includes a built-in flash device and which is outfitted with an additional lighting device according to the prior art.

An exemplary multi-unit flash system is depicted in a drawing figure which is attached to this patent document and which has been identified as FIG. 1. In FIG. 1, a casing or housing 52 supports a strobe/flash unit disposed in an upper part of a camera body 51. A built-in strobe/flash unit 53 (master strobe) is located within the interior of the housing 52. A metal bracket fitting 57 is mounted in a lower part of the camera body 51. An external strobe/flash unit 58 (slave strobe) is mounted to camera body 51 via metal bracket fitting 57 (e.g., such as via a tripod mounting screw-type receptacle, etc.). External strobe/flash unit 58 is arranged at a position so that light emitted by built-in strobe/flash unit 53 is incident on a light receiving window and element 59 disposed in external strobe/flash unit 58.

When built-in strobe/flash unit 53 emits light, external strobe/flash unit 58 simultaneously commences light emission. Camera body 51 includes a light receiving unit which receives light reflected from the subject, and when a predetermined amount of received light corresponding to an exposure setting is realized, for example, light emission by built-in strobe/flash unit 53 is stopped. On the other hand, regardless of whether built-in strobe/flash unit 53 stops illuminating, external strobe/flash unit 58 stops light emission in accordance with a pre-set value. That is, external strobe/flash unit 58 emits light for a particular amount of time regardless of need and, possibly, to the point of over-exposure.

And, since light receiving window element 59 receives light from both built-in strobe/flash unit 53 and external strobe/flash unit 58, it is difficult to discriminate between the same for purposes of lighting control. That is, it is difficult to discriminate among the lighting sources that emit light to effectively and reliably control the emission of light by external strobe/flash unit 58.

As such, in FIG. 1, as in the case of many other prior multi-unit flash systems, it is impossible to simultaneously stop two or more flash lighting sources.

Figure 2:
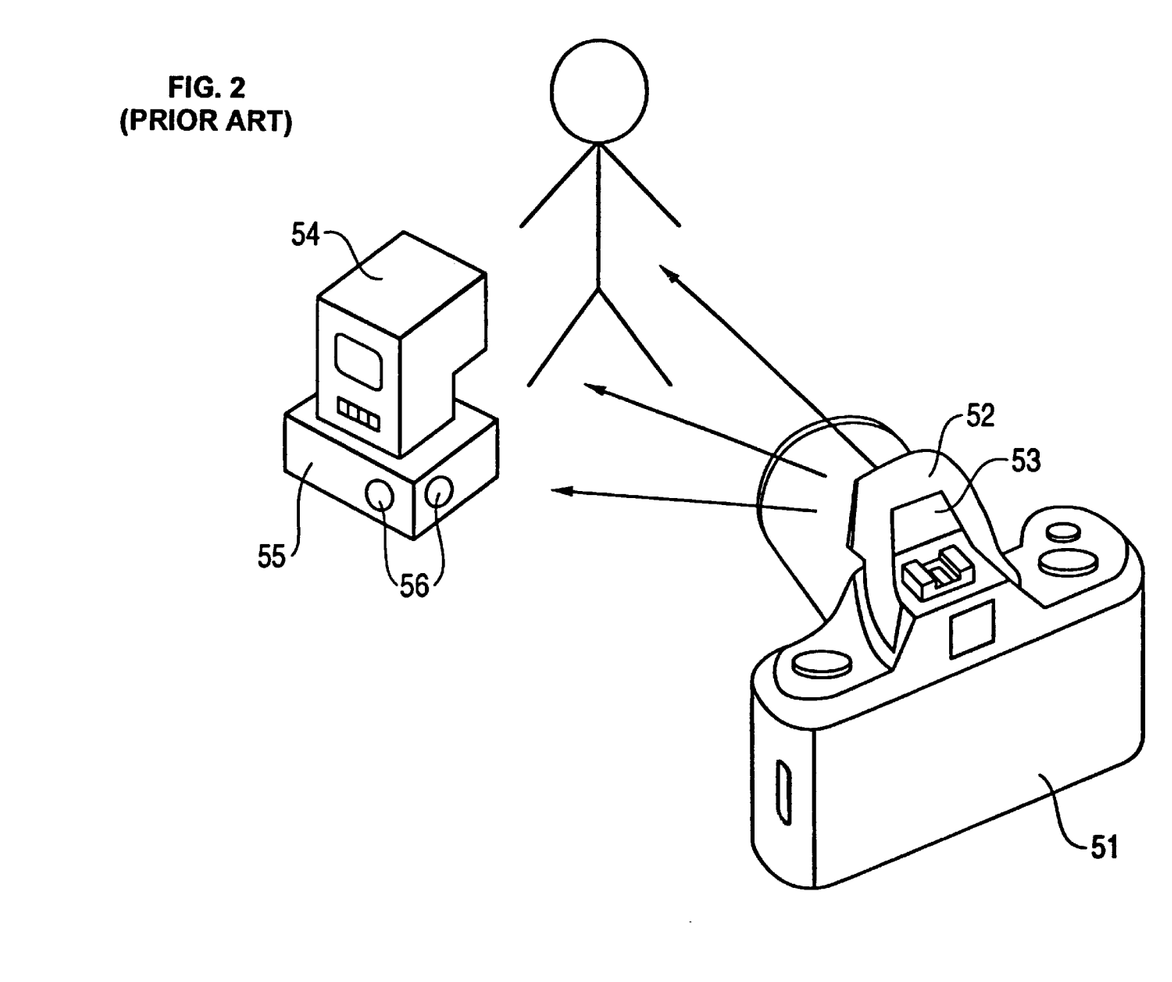
FIG. 2 is diagram of a camera that includes a built-in flash device and which is outfitted to operate with a wirelessly controlled additional lighting device according to the prior art.

To address the problems associated stopping light emission among multiple light sources, other developers have proposed elaborate wireless systems. For example, a prior wireless flash light emission system which permits remote placement of a slave flash unit is now described with reference to a drawing figure which is attached hereto and which is identified as FIG. 2. In FIG. 2, parts similar or like those shown in FIG. 1 bear the same reference numerals. In FIG. 2, a strobe/flash unit support casing 52 is disposed in an upper part of camera body 51, and a built-in strobe/flash unit 53 (master strobe) is located within the same. Camera body 51 is facing the subject, and light emitted by built-in strobe/flash unit 53 is projected in the direction of the subject.

A slave strobe/flash unit 54 is connected to a signal receiving control device 55. A light receiving window 56 is disposed in signal receiving control device 55. Signal receiving control device 55 has a light receiving window 56 arranged facing the direction of built-in strobe/flash unit 53 and is in a position which is irradiated by light emitted by built-in strobe/flash unit 53.

When light is emitted by built-in strobe/flash unit 53, signal receiving control device 55 receives light via light receiving window 56 and commences light emission simultaneously with the commencement of strobe light emission by built-in strobe/flash unit 53.

Camera body 51 includes a light receiving unit which receives light reflected from the subject. When a predetermined amount of light is received, light emission by built-in strobe/flash unit 53 is stopped. When light emission by built-in strobe/flash unit 53 stops, signal receiving control device 55 detects the same and causes slave strobe/flash unit 54 to stop simultaneously.

While the system shown in FIG. 2 goes a long way to provide better flash lighting results, complete freedom of placement of a remote or slave strobe/flash unit is not possible. That is, the system shown in FIG. 2 requires a slave strobe/flash unit to be placed in a location which is to be irradiated by light emitted by a master unit (i.e., in front of a master strobe/flash unit). As such, when a photographer desires to eliminate shadows of subjects, for example, a slave strobe/flash unit can not be placed in a location along side (left or right) or behind a master strobe/flash unit. Moreover, because it is necessary to place the slave strobe/flash unit in front of a master strobe/flash unit using a wide angle lens often is difficult.

Thus, there exists a need to provide a new and improved flash unit and corresponding system that will permit accurate control of light emission among multiple strobe/flash units and which will allow freedom of placement of remotely located slave type strobe/flash units. To be viable, such new and improved systems must be easy to setup and use, and be manufactured to be sold at effective price points.

SUMMARY OF THE INVENTION

The present invention has as its object to solve the aforementioned problems associated with wireless multi-unit flash illumination system and devices. In particular, the present invention solves such problems by providing new and improved housings that are constructed from materials that allow for enhanced remote device control and, as a result, improved photographic and imaging operations. More particularly, the present invention solves such problems by providing new and improved housings for flash units and flash control circuitry that allow flash units (local or remote) to be accurately controlled to enhance photographic operations. Furthermore, the present invention solves the aforementioned problems by providing new and improved housings for flash units and flash control circuitry that allow a photographer to easily, quickly, and freely arrange and place remote flash units without hindering photographic operations. As a result, the present invention provides new and improved systems (e.g., command modules, etc.) that can be applied to systems and devices other than flash units and the like that may be remotely located and operated to realize improved photographs and/or other types of images (e.g., digitally produced images, etc.).

The present invention achieves the aforementioned objects to deliver the aforementioned benefits by providing a flash unit for a camera that includes a flash illumination device which illuminates during imaging operations of the camera, and a housing encasing the flash illumination device. The housing is made from a material that transmits infrared light emitted by the flash illumination device to an area outside of the housing.

According to another aspect of the present invention, provided is a camera that includes a built-in flash unit that further includes a flash illumination device which illuminates during operations of the camera. The camera also includes a housing that encases the built-in flash illumination unit. The housing is made from a material that transmits infrared light emitted by the flash illumination device to an area outside of the housing.

And, according to another aspect of the present invention, provided is a command module for use by a camera in controlling another device. The command module includes an infrared light source, and a housing that completely encases the infrared light source. The housing is made from a material that transmits infrared light emitted by the infrared light source to an area outside of the housing. The light emitted by the infrared light source and which is transmitted by the housing is used to control another device. The command module also includes a coupling member connected to the housing for coupling the housing to the camera. The coupling member permits the camera to control the infrared light source.

BRIEF DESCRIPTION OF THE DRAWING FIGURES

The present invention is described below with reference to the following drawing figures, of which.

DETAILED DESCRIPTION OF THE PREFERRED EMBODIMENTS

The present invention is now discussed with reference to the drawing figures that were briefly described above. A discussion of each preferred embodiment of the present invention is followed by a corresponding discussion of its operation. Unless otherwise specified, like parts and processes are referred to with like reference numerals.

In the following paragraphs, the term "strobe" as it relates to a device or unit means a flash type unit used to provide additional illumination during a photographic or other camera operation (e.g., during an electronic or digital imaging operation, during a device test operation, etc.).

First Preferred Embodiment

Figure 3:
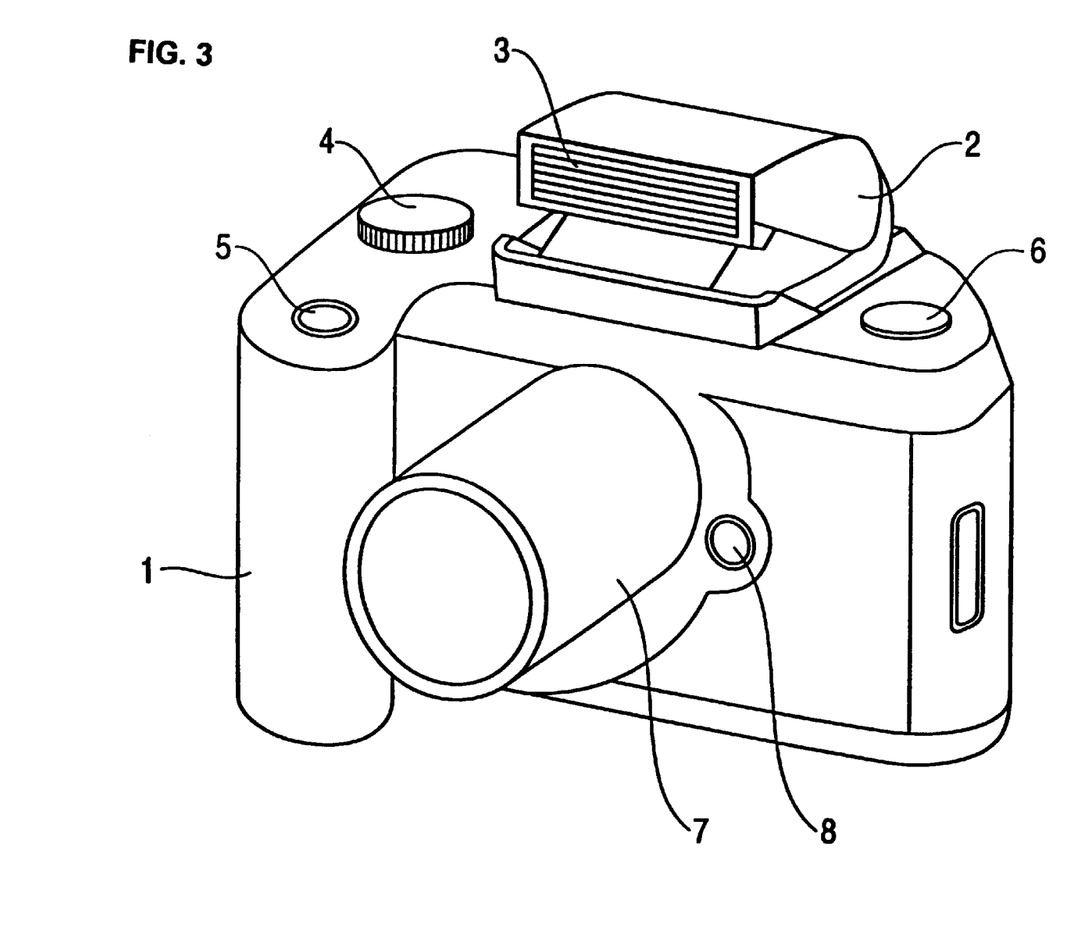
FIG. 3 is a diagram of a camera that includes a built-in strobe device that further includes a housing constructed in accordance with a first preferred embodiment of the present invention.

Referring now to FIG. 3, depicted therein is a diagram of a camera having a built-in strobe unit according to a first preferred embodiment of the present invention. In FIG. 3, a strobe support casing or housing 2 is disposed in an upper part of a camera body 1. A built-in strobe device 3 (e.g., a flash tube, etc.) is arranged in the interior of the strobe support housing 2. The strobe support housing is made by mixing dyestuffs which do not transmit visible light but which transmit infrared light with acrylic, polycarbonate and other transparent plastic materials. For example, dyestuffs which transmit infrared light and which may be used in the context of the present invention include, but are not limited to, anthraquinone type (red), anthraquinone type (green), and perylene type (yellow).

With the camera shown in FIG. 3, an operating mode changeover button 4, a shutter button 5, and an operating button 6 are arranged in an upper part of the camera body 1. Operating mode changeover button 4 is used to perform setting of shutter speed and aperture, etc. Operating button 6 is used to perform setting of film sensitivity, photo-metric mode, etc.

A photographic lens 7 is mounted at the front of camera body 1, and a lens attachment/detachment button 8 is arranged along side of a lens mount (not shown).

Figure 4A:
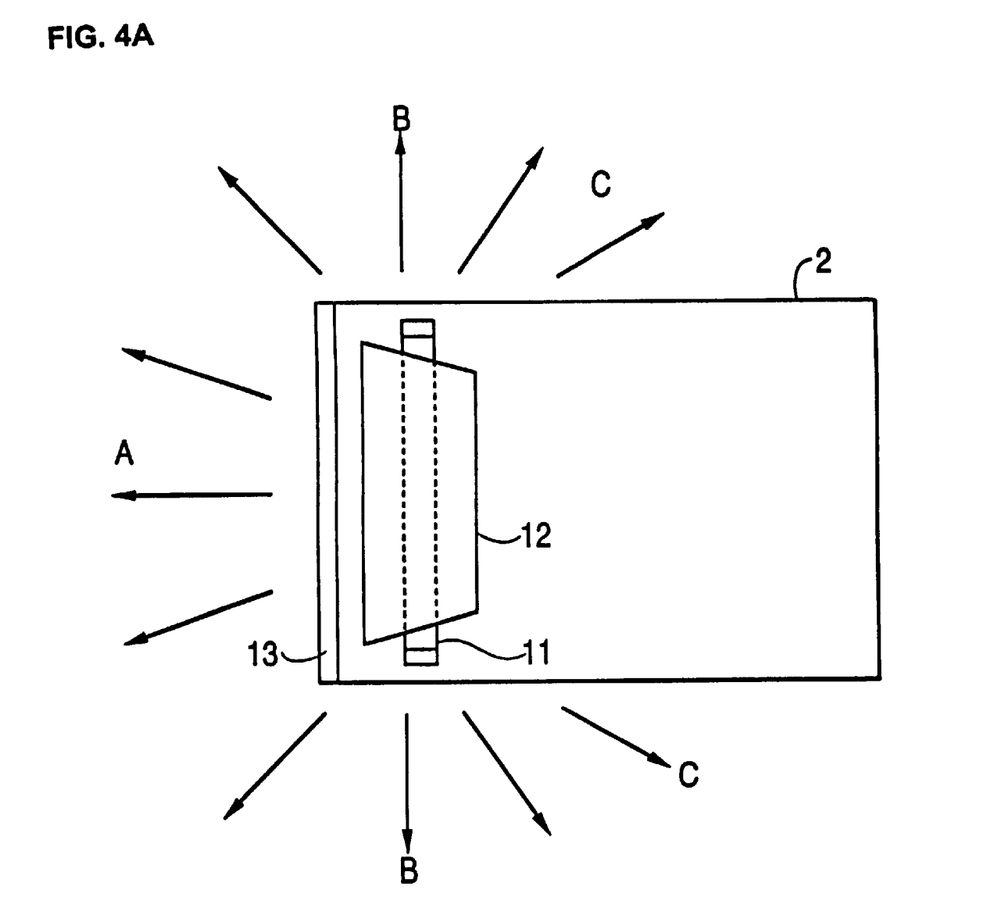
FIGS. 4A and 4B are top and side views, respectively, of the housing of the built-in strobe device depicted in FIG. 3.
Figure 4B:
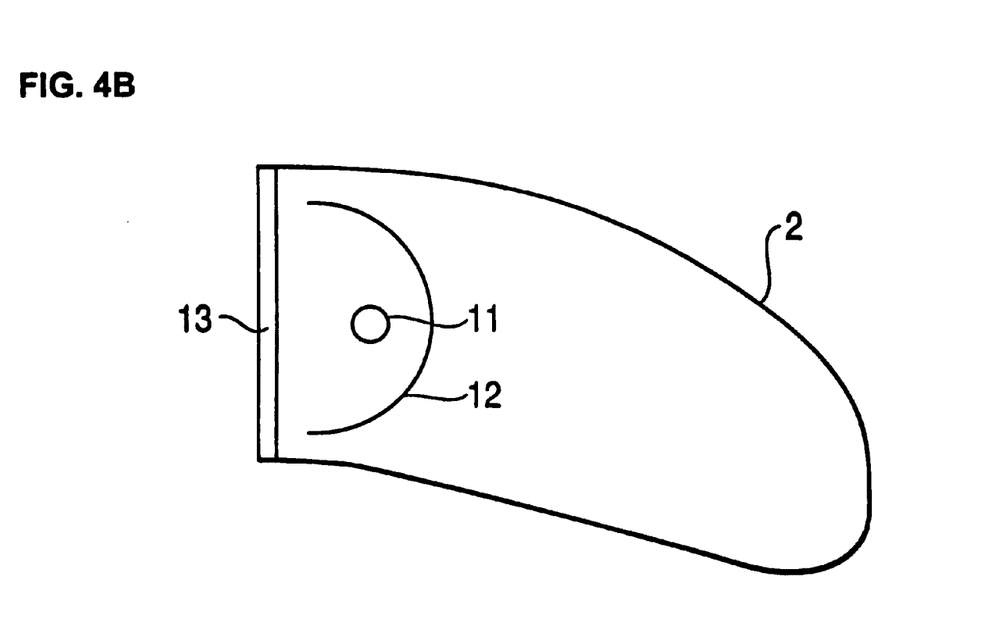

Referring now to FIGS. 4A and 4B together, depicted therein are views of the strobe unit shown in FIG. 3; FIG. 4A is a top view and FIG. 4B is a side view. In FIGS. 4A and 4B, a xenon tube 11 (e.g., a xenon type flash tube) is arranged in the interior of strobe support housing 2, and a reflecting shade 12 of semi-cylindrical shape is arranged so as to surround the periphery of tube 11. A diffusing plate 13 is arranged in an open aperture portion of strobe support housing 2.

When xenon tube 11 emits light, most of that light is reflected by reflecting shade 12 and radiates in the forward direction (direction A) through diffusing plate 13. Nevertheless, a portion of the infrared light contained in the emitted light passes through the strobe support housing 2 and radiates in side-wise directions (e.g., direction B), and a rearward direction (direction C) among others.

Figure 5:
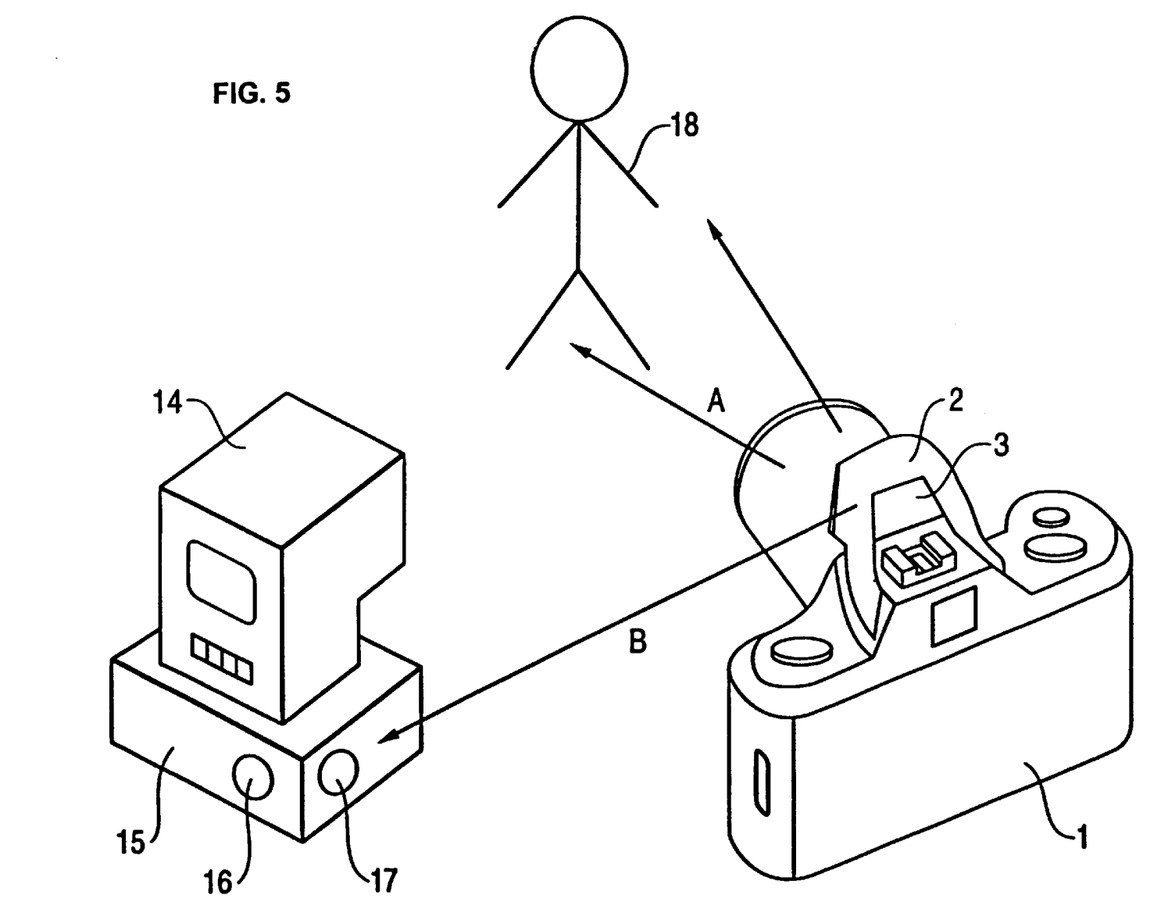
FIG. 5 is a system diagram that illustrates the camera depicted in FIG. 3 in operation with a wirelessly controlled slave strobe device provided in accordance with the present invention.

Referring now to FIG. 5, depicted therein is a diagram of an illumination system in which the camera depicted in FIG. 3 is used with a remotely located slave strobe unit in accordance with a preferred embodiment of the present invention. In FIG. 5, camera body 1 is set to facilitate an imaging operation related to subject 18. Normally, a shadow can arise at rear of subject 18 if only built-in strobe 3 were allowed to emit light. Such a shadow could destroy or interfere with the taking of an otherwise good photograph. Consequently, by setting a slave strobe 14 to the side of camera body 1, the same can now be used to eliminate any such shadows with respect to subject 18.

Slave strobe 14 is coupled to a control device 15. Light receiving windows 16 and 17 are disposed in control device 15. Control device 15 may be disposed in a housing that includes a flash unit mounting device (e.g., a hot shoe, etc.) to which slave strobe 14 may be mounted. Alternatively, slave strobe 14 and other control circuitry such as control device 15 may be included in a single housing structure (i.e., a new type of flash unit equipped to operate in accordance with the present invention).

As such, on depressing shutter button 5, light emission by built-in strobe 3 commences. Most light emitted by built-in strobe 3 radiates in the forward direction (direction A). Nevertheless, infrared light passes through the strobe support housing 2 made of infrared light transparent material (as discussed above) and radiates to the sides (direction B) and rear thereof. In turn, control device 15 receives infrared light via light receiving windows 16 and 17. Control device 15 then transmits a strobe light emission commencement signal to slave strobe 14. Slave strobe 14 commences light emission based on the strobe light emission commencement signal.

When light emission by built-in strobe 3 stops, infrared light is no longer radiated and received by a light receiving element coupled to control device 15 (see FIG. 6 as discussed below). As such, control device 15 transmits a light emission stop signal to the slave strobe 14. Based on this signal, slave strobe 14 stops emitting light.

Figure 6:
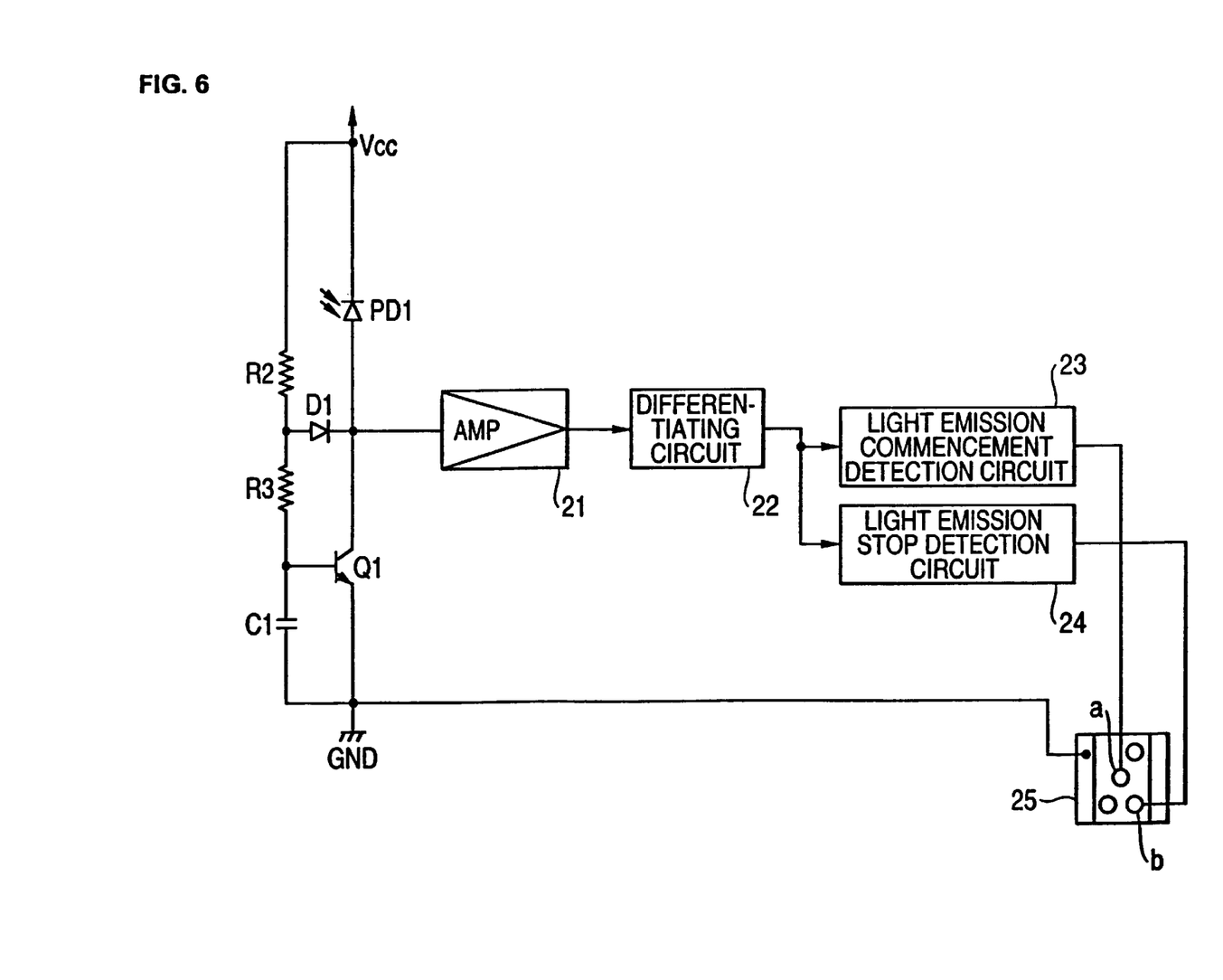
FIG. 6 is a circuit diagram of a flash unit control device such as one that operates in conjunction with the slave strobe device depicted in FIG. 5.

The operations of built-in strobe 3 (master strobe) and slave strobe 14 are next described with regard to FIGS. 6 and 7 to which reference is now made.

Referring now to FIG. 6, depicted therein is a circuit diagram corresponding to control device 15. Light receiving element PD1 corresponds to a light receiving element arranged in control device 15 at the interior of light receiving windows 16 and 17 (FIG. 5).

A power supply Vcc is connected to a cathode of light receiving element PD1. The cathode of a diode D1 is connected to the anode of light receiving element PD1. The collector of a transistor Q1, and a voltage amplifier 21, are connected to the anode of diode D1. The emitter of transistor Q1 is grounded, and the terminal of one side of a resistor R2 is connected to the power supply Vcc. Moreover, the other terminal of the resistor R2 is connected to a terminal of resistor R3 and to the anode of diode D1. The other terminal of resistor R3 is connected to the base of transistor Q1 and to a terminal of a capacitor C1. The other terminal of capacitor C1 is connected to ground (GND).

Resistors R2, R3, diode D1, and transistor Q1 constitute an AGC (Automatic Gain Control) circuit. A collector voltage (Vce) of transistor Q1 becomes the output of such an AGC circuit.

The output terminal of the voltage amplifier 21 is connected to a light emission commencement detection circuit 23 via a differentiating circuit 22, and to the input terminal of a light emission stop detection circuit 24. The output terminal of the light emission commencement detection circuit 23 is connected to a contact point terminal a of a hot shoe 25, and the output terminal of the light emission stop detection circuit 24 is connected to a contact point terminal b of hot shoe 25.

When the master strobe is not emitting light (e.g., a state in which the photoelectric current of the light receiving element PD1 is zero or very small), the current from the power supply Vcc flows into the collector of transistor Q1 through the resistor R2 and the diode D1. Moreover, to drive the collector current into the base of transistor Q1, the base current flows into the base of transistor Q1 through resistors R2, R3. The relationship of the base current and the collector current is about 1/hfe (current amplification factor). As a result, the collector voltage (Vce) of transistor Q1 becomes fixed at about 0.1 V.

Figure 7A:
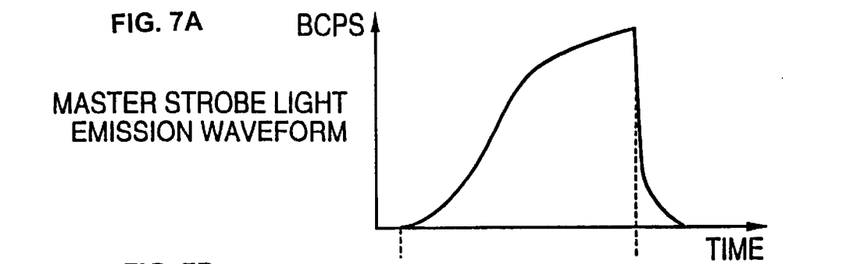
FIGS. 7A, 7B, 7C, 7D, 7E, and 7F are timing charts that illustrate timing characteristics related to the circuit depicted in FIG. 6.

When light receiving element PD1 receives infrared light emitted by a master strobe (e.g., built-in strobe 3, etc.), light receiving element PD1 outputs a photoelectric current to the collector of transistor Q1. FIG. 7A shows the light emission waveform of such a master strobe.

The result of the photoelectric current flowing into the collector of transistor Q1 is that the collector voltage (Vce) rises. Accompanying such operation, the voltage of the anode side of diode D1 rises, and the current flowing into resistor R3 increases. At the same time, capacitor C1 becomes a delay element with respect to transistor Q1, and the base voltage (Vbe) of transistor Q1 increases after a time delay necessary to charge capacitor C1. After charging capacitor C1, the base current of transistor Q1 increases, and transistor Q1 can drive in-flowing collector current (photoelectric current), and functions as an AGC. That is, the output of the AGC circuit (collector voltage Vce) increases by means of the inflow of photoelectric current with respect to the charging of the capacitor C1. When charging of capacitor C1 ends, the base current increases, and transistor Q1, by pulling in-flowing photoelectric current into the emitter, functions as an AGC, and becomes a constant voltage.

Figure 7B:
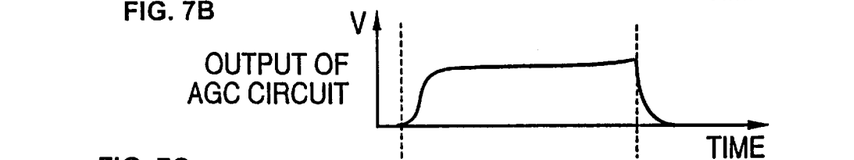

As shown in FIG. 7B, after the output of the AGC circuit (collector voltage Vce) has suddenly increased, a constant voltage (1–2 V) is realized.

Figure 7C:
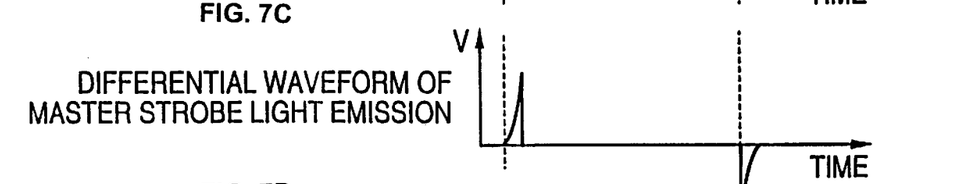

The output voltage of the AGC circuit is input to voltage amplifier 21. The amplified voltage reaches the differentiating circuit 22. In the rise of the light emission of the master strobe, a positive differential pulse is realized in the differentiating circuit 22. In the fall of a light emission, a negative differential pulse is realized. Such a waveform is shown in FIG. 7C.

Figure 7D:
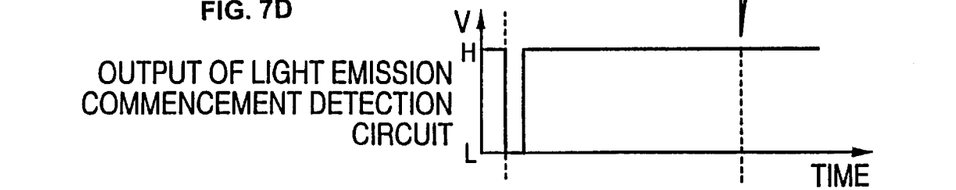

The differential pulses are input to the light emission commencement detection circuit 23 and the light emission stop detection circuit 24. The light emission commencement detection circuit 23, when a positive differential pulse is input thereto, as shown in FIG. 7D, changes the output from a H level to a L level. The slave strobe 14 commences slave strobe light emission at the same time.

Figure 7E:
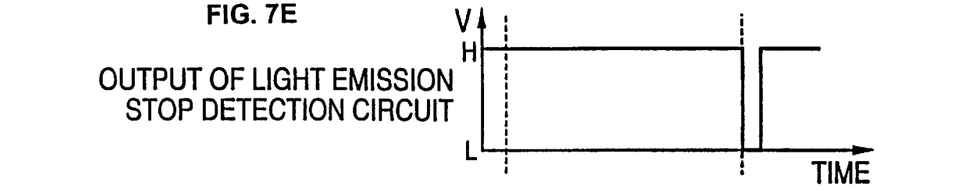
Figure 7F:
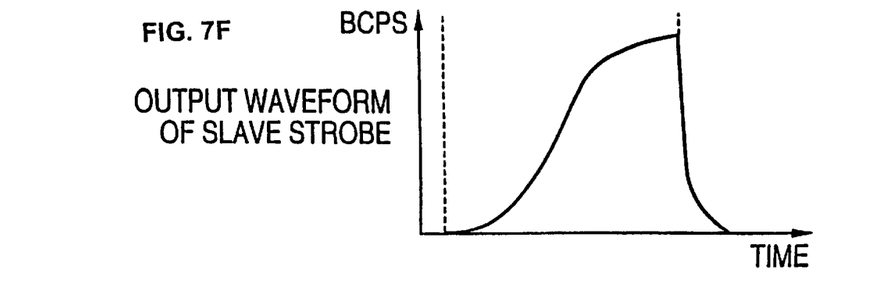

When the subject, irradiated by strobe light emitted by the master strobe (built-in strobe 3) and the slave strobe 14, is appropriately imaged, light emission of the master strobe stops due to the operation of a TTL (transistor-transistor logic) light regulating circuit (not shown in the drawing) in the camera. As a result, a negative differential pulse is formed by the differentiating circuit 22 which is input to the light emission stop detection circuit 24. As shown in FIG. 7E, when a negative differential pulse is input, the output of the light emission stop detection circuit changes from a H level to a L level. As such, slave strobe 14 stops emitting light at this time. In FIG. 7F, a light emission waveform of the slave strobe 14 is shown.

The camera shown in FIG. 3 is a TTL type camera. That is, photometry of reflected light from the subject is performed through the photographic lens, and the light output of the master strobe is caused to stop at a time corresponding to an appropriate exposure. The light adjustment circuit of the camera does not distinguish between the strobe light of the master strobe (built-in strobe 3) and the strobe light from the slave strobe 14, but stops the light emission of both at a point in time when the exposure of the subject, irradiated by the flash light of both, becomes appropriate.

In the above-described first preferred embodiment of the present invention, strobe support housing 2 transmits infrared light. Accordingly, master strobe unit 3 can be used to control the emission (and stoppage of the same) of light by slave strobe 14. Moreover, the position where the slave strobe 14 is located is not limited to being in front of a camera, and can be freely arranged in a region reached by the infrared rays which are contained in the master strobe light emission. That is, by way of the present invention, slave strobe unit 14 now may be placed to the side of a camera, to the rear of a camera, etc. And, because strobe support housing 2 does not transmit visible light such as to the rear of a camera and toward a photographer, a photographer is not stunned by bright flashes of light.

Second Preferred Embodiment

Figure 8:
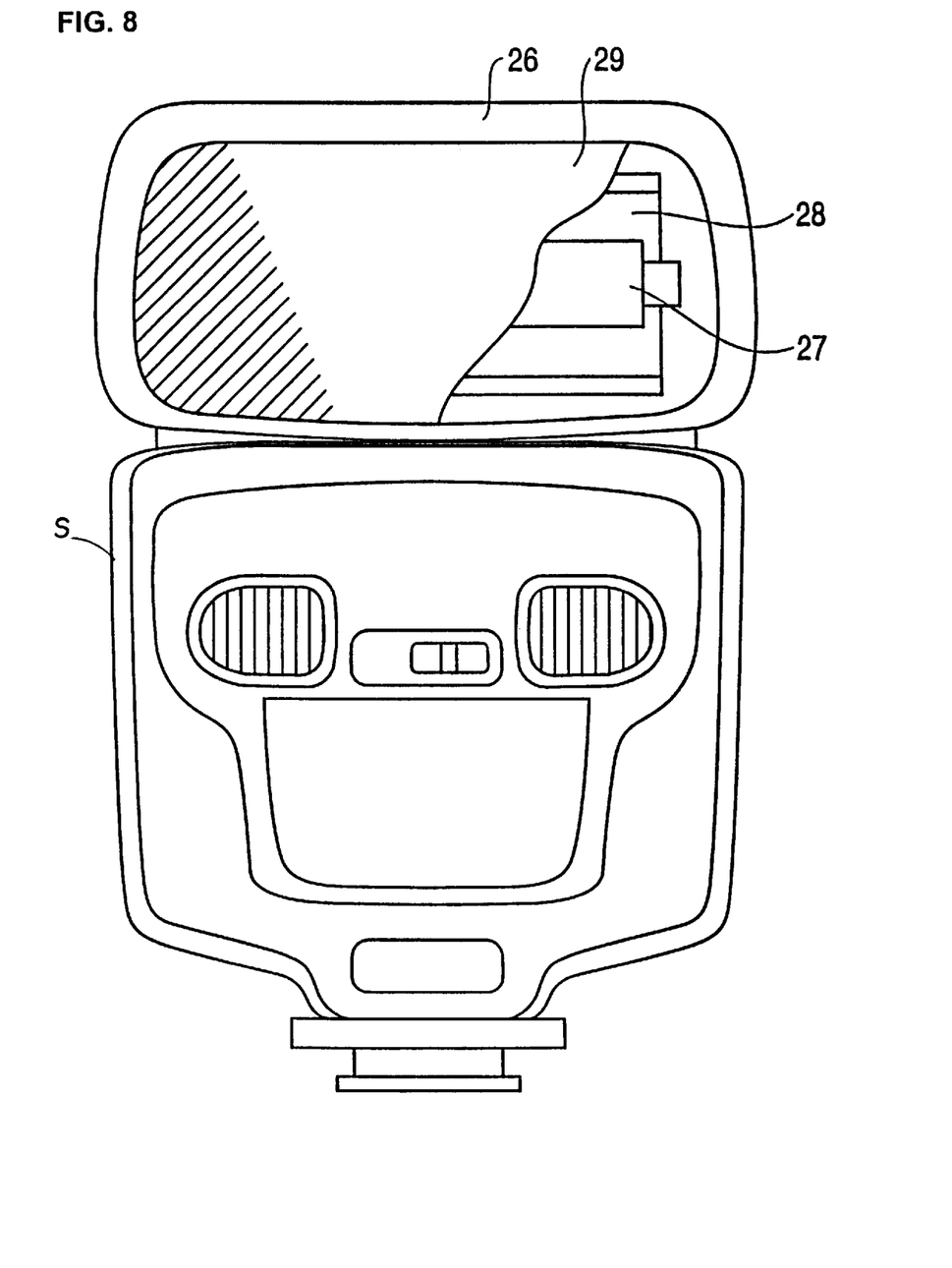
FIG. 8 is a diagram of a flash unit having a housing constructed in accordance with a second preferred embodiment of the present invention.

A second preferred embodiment is now described in detail with regard to FIG. 8 to which reference is now made. In particular, FIG. 8 is a diagram of a strobe device for a camera according to a second preferred embodiment of the present invention.

In FIG. 8, a xenon tube 27 is arranged in strobe device S. A semi-cylindrical reflecting shade 28 is arranged to the rear of xenon tube 27. A diffusing plate 29 is arranged in the forward direction of the xenon tube 27. A strobe housing is arranged to enclose xenon tube 27 and reflecting shade 28. Strobe housing 26 is made by mixing acrylic, polycarbonate and/or other similar transparent plastic material with dyestuffs which do not transmit visible light but which transmit infrared light. Such dyestuffs include, but are not limited to, anthraquinone type (red), anthraquinone type (green), and perylene type (yellow). When mixed, the resulting plastic material appears black or sufficiently dark in visible light.

Strobe/flash light is emitted from the front surface of the strobe device, and only the infrared light contained in the strobe light emission is radiated to the side and rear. That is, in the present preferred embodiment, the strobe housing is formed to allow infrared light to be transmitted at the sides thereof. Then, using the emitted infrared light, control can be performed to stop light emission by a slave strobe as similarly described with regard to the first preferred embodiment. As such, for purposes of brevity, further details regarding such control and operation are omitted.

Third Preferred Embodiment

Figure 9:
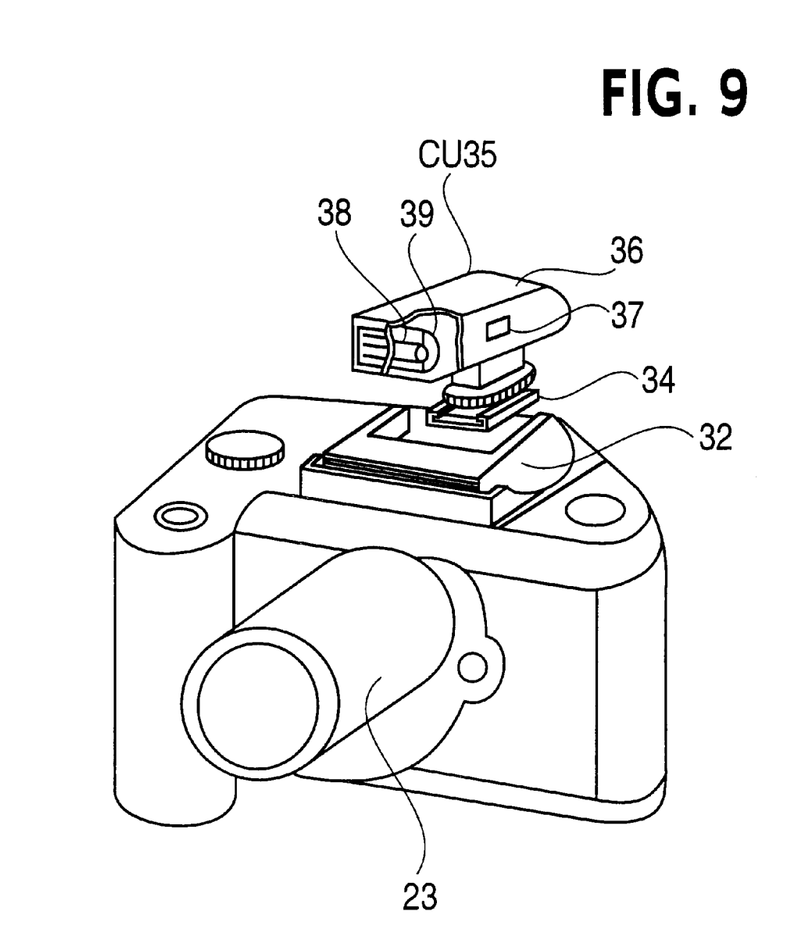
FIG. 9 is a diagram of a system in which a command module is provided to work with a camera to control a remotely located device such as a remotely located flash unit in accordance with a third preferred embodiment of the present invention.

Referring now to FIG. 9, depicted therein is a diagram of a system in which a flash illumination command module communicates with a remotely located flash unit according to a third preferred embodiment of the present invention.

In particular, FIG. 9 depicts a camera 31 (like or similar to camera 1 shown in FIG. 3) having a lens 23 (e.g., a zoom lens, a wide angle lens, etc.) mounted thereon. Camera 31 has a hot shoe 34 which is used to mount a peripheral device (e.g., a flash unit) and to electrically couple the same to circuitry within camera 31.

Camera 31 includes a built-in flash device 32 (having a strobe unit, etc.—not shown) which is shown in a housed position within a body of camera 31.

A control unit (CU) 35 is mounted on camera 31 via hot shoe 34. As described herein, CU 35 is a used as a source of infrared light which can be used to control other devices such as external, remote flash devices.

CU 35 has a housing 36 which is made and constructed from a material (e.g. a plastic material of the type described above) which is transparent to infrared light but not visible light. For example, housing 36 (shown in cutaway fashion) may be made by mixing dyestuffs which do not transmit visible light but which transmit infrared light with acrylic, polycarbonate and other transparent plastic materials. For example, dyestuffs which transmit infrared light and which may be used in the context of the present invention include, but are not limited to, anthraquinone type (red), anthraquinone type (green), and perylene type (yellow). Housing 36 may be constructed from a number of pieces such as top and bottom casing members, etc. For example, housing 36 may be constructed to have a top cover unit that is connected to a bottom case member, etc.

A flash tube 38 and a reflector 39 along with corresponding control circuitry (not shown) are disposed within housing 36. The control circuitry within CU 35, in conjunction with appropriate signals sent from circuitry within camera 31 and/or in accordance with the operation of a test switch and button arrangement 37 (discussed below), controls the operation of flash tube 38.

Test switch and button arrangement 37 and corresponding circuitry within CU 35 may be used to test flash illumination operations of a remotely located device. Further details related to test switch and button arrangement 37 are discussed below with regard to FIG. 10.

Also shown in FIG. 9 is a flash unit 40 which may be similar to or like slave strobe 14 as shown in FIG. 5. Flash unit 40 is electrically coupled to slave control unit 41 via a hot shoe 43. Slave control unit 41 includes a light receiving unit 42 (shown in phantom lines). Light receiving unit 42 is configured to receive infrared light that is emitted by flash tube 38 within CU 35 and which is transmitted via housing 36.

In operation, upon receipt of a light emission commencement signal from circuitry within camera 31, CU 35 and, in particular, flash tube 38 emits light. Housing 36, however, only permits infrared light to pass therethrough.

In turn, light receiving element 42 of slave control unit 41 receives the infrared light emitted by flash tube 38 which passed through housing 36. Based on such received light, slave control unit 41 transmits a light emission commencement signal to flash unit 40. As a result of such a signal, flash unit 40 and a light source therein (e.g., a flash tube, etc.) emits light to illuminate a subject or scene.

On the other hand, light emission by flash unit 40 is stopped as next described. For example, based on a detected amount of light emitted by flash unit 40 at camera 31, circuitry within camera 31 transmits a stop signal to CU 35 to cause the same to stop light emission by flash tube 38. When flash tube 38 stops emitting light, the amount of infrared light realized by light receiving element 42 decreases. As a result, slave control unit 41 sends a light emission stop signal to flash unit 40 which, in turn, stops emitting light.

It is important to note that light receiving element 42 receives infrared light emitted by CU 35 and light emitted by flash unit 40 in addition to light reflected by a subject or scene to be photographed, imaged, etc. However, the light emitted by CU 35 is infrared light which includes no visible light rays. As such, in accordance with the present invention, light receiving element 42 can discriminate among all light it receives so that flash unit 40 can be caused to emit an appropriate amount of light.

Accordingly, the structures shown in FIG. 9 form a flash lighting system. Such a system allows a command module type device (e.g., CU 35) to emit infrared (non-visible light) which may be used to control another device such as a slave type flash unit, etc.

It should also be noted that flash unit 40 has been placed in a position which is behind camera 31. Such an arrangement is made possible by the present invention as infrared light is permitted to be transmitted to such a location. Accordingly, the present invention now allows a remotely located device like or similar to flash unit 40 (or another remotely controlled device) to be freely located based on a photographer's choice.

Although the term "slave" has been used in the context of FIG. 9 to refer to control device 41, such a term is meant to refer to any device that is controlled via operation of a control unit like or similar to CU 35 coupled to camera 31.

Figure 10:
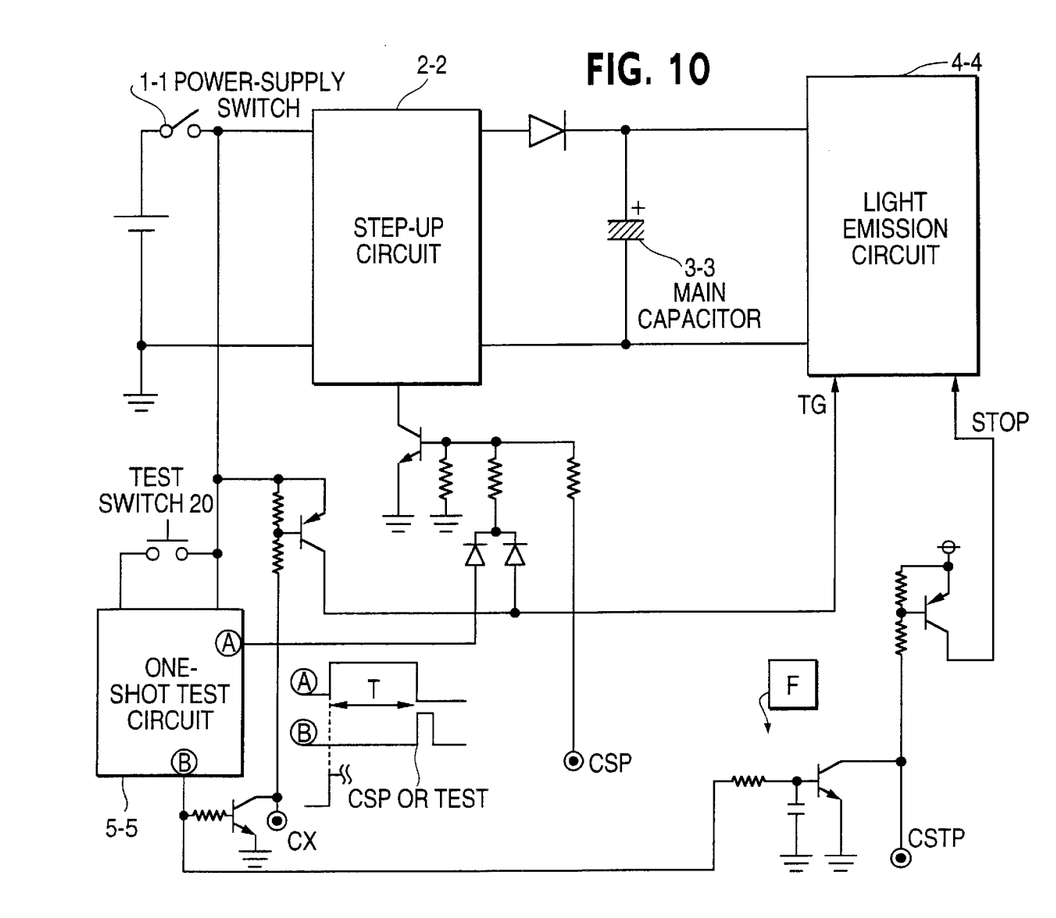
FIG. 10 is a schematic diagram of the circuitry included within the command module depicted in FIG. 9.

The following discussion relates to the operations of the structures shown in FIG. 9 and those shown in a circuit diagram depicted in FIG. 10 to which reference is now made.

In particular, after control unit CU 35 is mounted on hot-shoe 34 of camera 31 and a power supply switch 1—1 is set to an ON state, the following operations may commence during photographic or other imaging and camera type operations.

In FIG. 10, hot-shoe 34, as is well known in the art, allows a device like a flash unit to be physically mounted on and electrically coupled to a camera body and control circuitry maintained therein. Accordingly, hot-shoe 34 acts as a coupling member in the context of the present invention to allow CU 35 (e.g., a command module for remotely controlling other devices such as remotely located flash units) to be physically mounted to a camera body of camera 31 and to be electrically coupled to control circuitry maintained therein.

After CU 35 has been turned ON by operating a power supply switch 1—1, for example, and after the release button of camera 31, for example, is half depressed, a step-up commencement signal CSP is transmitted from the camera via hot shoe 34. By means of the CSP signal, a step-up circuit 2—2 commences operation, to step-up a voltage supplied to a main capacitor 3—3, and stops when charging of main capacitor 3—3 is complete.

When the release button is fully depressed, a light emission commencement signal CX is transmitted from camera 31 via hot shoe 34. A signal TG also is transmitted to the light emission circuit 4—4, and flash light emission occurs in accordance with the charge stored in main capacitor 3—3. Such flash illumination operations will be immediately understood by those skilled in the art.

The aforementioned flash light emission signal CX causes both visible light and infrared light to be emitted by flash tube 38. However, housing 36, as noted above with regard to FIG. 9, completely encases and covers such a flash tube and thereby prevents transmission of the visible light. Instead, in accordance with the present invention, housing 36 permits transmission of infrared light only. Such infrared light is transmitted to areas outside of housing 36.

At the same time, in similar fashion to the operation of the other preferred embodiments discussed above, infrared light emitted by CU 35 is received by light receiving element 42 of slave control unit 41. In turn, slave control unit 41 causes flash unit 40 to emit light.

The flash light emitted by flash unit 40 illuminates a subject or scene to be imaged, and light reflected by the same is received by a sensor and corresponding circuitry disposed in camera 31. According to the output from such a sensor, camera 13 outputs a light emission stop signal CSTP, and CU 35 in accordance with the CSTP signal, stops light emission by controlling light emission circuit 4. When the emission of infrared light by CU 35 stops, light receiving element 42 detects the same. In turn, slave control unit 41 causes light emission by flash unit 40 to stop.

In addition to the operations described above with regard to remotely controlling flash unit 40 during photographic or other camera operations, the present invention allows a remotely located device such as a remotely located flash unit to be tested prior to commencement of other camera type operations. Such testing operations and the structures to support the same are next described.

In particular, after CU 35 is mounted on hot shoe 34 of camera 31, for example, and a power supply switch is set to an ON state, the following operations may be carried out to test a remotely controlled device such as remotely located flash unit 40.

As noted above with regard to FIG. 9, CU 35 is equipped with a test light emission switch and button arrangement 37. Such an arrangement is provided to allow a photographer, for example, to test whether flash unit 40 will operate properly when called upon to emit light during later photographic/camera operations. For example, a photographer may have camera 31 and CU 35 mounted thereon in his right hand and flash unit 40 in his left hand. On operating switch/button arrangement 37 with his left hand, a corresponding signal is input to a one-shot test circuit 5—5 which, in turn, outputs a Hi signal from terminal A thereof for a predetermined time t. Based on the signal received from terminal A, a step-up circuit 2—2 commences a step-up operation. That is, in accordance with the signal from terminal A, the Hi signal replaces the half depression signal CSP from camera 31 normally realized during photographic or camera and imaging operations.

Upon the realization of the signal output from terminal A and after a predetermined time t has elapsed, the signal from the terminal A is set to an OFF state. At the same time, a signal is output from the terminal B. The signal output from terminal B in conjunction with a light emission signal TG sent to light emission circuit 4—4, causes light emission by light emission circuit 4—4. As such, light is emitted, but only infrared light passes through housing 36 of CU 35. That is, the signal from terminal B is input to a circuit F to set a time constant therefore and to cause a delay of a period of time such as about 100 microseconds, etc. Thereafter, a stop signal is input to light emission circuit 4—4 to stop light emission.

The signal output from terminal B replaces the CSTP signal normally transmitted from camera 31. Accordingly, after test light output switch/button 37 is operated for a predetermined time t (e.g., manually pressed, etc.), infrared light is emitted by CU 35. In response, flash light is emitted by flash unit 40. As such, a photographer can now confirm whether proper remote control operations will occur during subsequent camera operations.

The predetermined time t discussed above may be set to any amount of time depending on design requirements. However, predetermined time t preferably is set to be about 1–3 seconds.

The preferred embodiments illustrated in FIGS. 3–10 and discussed above are directed to multi-flash unit systems in which a master unit (or command module) may be operated in conjunction with at least one other slave unit. Although a master unit has been shown in operation with a single slave unit, the present invention is not so restricted. To the contrary, the present invention permits the use of more than one slave which is controlled via operation of a master which, in turn, is controlled via circuitry in a camera or other type of imaging device.

Moreover, while the preferred embodiments discussed above include at least two flash lighting sources (e.g., a master unit and a slave unit), the present invention is not so restricted. For example, the present invention now makes it possible to remotely locate a single flash unit (what would otherwise be considered a slave, for example) relative to a camera that includes a master control unit operated by the camera. That is, the housing of what would otherwise be considered as a master flash unit may be constructed so that only infrared light would be permitted to be transmitted to areas outside of such a housing and, in turn, be used to control a remotely located flash lighting unit or other device. Such an arrangement is shown in FIGS. 9 and 10 which were discussed above.

As such, the present invention provides certain benefits not heretofore realized by prior devices and systems. For example, a strobe housing of a master strobe unit provided in accordance with the present invention is transparent to infrared light. Accordingly, by using infrared light generated by a master strobe unit to control a slave strobe unit, for example, a photographer can freely position the slave strobe unit in an area in the front, at the sides, and at the rear of a camera. And, even when a wide angle lens is used as an image taking lens, it becomes possible to arrange a slave strobe unit in a position where it does not shade the field angle of view.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. A flash unit for a camera, comprising:
    a flash illumination device which illuminates during operations of the camera; and
    a housing encasing said flash illumination device, said housing being made from a material that transmits infrared light emitted by said flash illumination device to an area outside said housing.

2. The flash unit according to claim 1, wherein said material is opaque to visible light.

3. The flash unit according to claim 1, wherein said material is made from transparent plastic mixed with a dye selected from the group consisting essentially of anthraquinone (red), anthraquinone (green), and perylene (yellow).

4. The flash unit according to claim 1, wherein said material is a plastic material such as acrylic.

5. The flash unit according to claim 1, wherein said material is a plastic material such as polycarbonate.

6. The flash unit according to claim 1, wherein said flash illumination device is a xenon flash tube.

7. The flash unit according to claim 1, wherein said infrared light is transmitted to said area outside of said housing to control the operation of another flash unit.

8. The flash unit according to claim 1, further comprising a test circuit and corresponding test operation switch to be operated to cause said test circuit to cause said flash illumination device to illuminate independently of operations to be performed by the camera.

9. The flash unit according to claim 1, wherein said housing includes an aperture, a transparent aperture cover permitting visible light and said infrared light to be transmitted thereby, a back permitting said infrared light to be transmitted thereby, and two sides joining a place on said housing corresponding to said aperture and said back and permitting said infrared light to be transmitted thereby.

10. The flash unit according to claim 1, wherein said housing includes an aperture, a transparent aperture cover permitting visible light emitted by said flash illumination device to be transmitted thereby, a back permitting no light to be transmitted thereby, and two sides joining a place on said housing corresponding to said aperture and said back and permitting said infrared light to be transmitted thereby.

11. The flash unit according to claim 1, wherein said housing permits only infrared light to be transmitted thereby.

12. A camera, comprising:
    a built-in flash unit including a flash illumination device which illuminates during operations of the camera; and
    a housing encasing said built-in flash illumination device, said housing being made from a material that transmits infrared light emitted by said flash illumination device to an area outside said housing.

13. The camera according to claim 12, wherein said material is opaque to visible light.

14. The camera according to claim 12, wherein said material is made from transparent plastic mixed with a dye selected from the group consisting essentially of anthraquinone (red), anthraquinone (green), and perylene (yellow).

15. The camera according to claim 12, wherein said material is a plastic material such as acrylic.

16. The camera according to claim 12, wherein said material is a plastic material such as polycarbonate.

17. A command module for use by a camera in controlling a remotely located device, comprising:

an infrared light source;

a housing encasing said infrared light source, said housing being made from a material that transmits infrared light emitted by said infrared light source to an area outside said housing, said light emitted by said infrared light source and transmitted by said housing controlling a remotely located device; and a coupling member connected to said housing for coupling said housing to the camera and for permitting the camera to control said infrared light source.

18. The command module according to claim 17, wherein said material is opaque to visible light.

19. The command module according to claim 17, wherein said material is made from transparent plastic mixed with a dye selected from the group consisting essentially of anthraquinone (red), anthraquinone (green), and perylene (yellow).

20. The command module according to claim 17, wherein said material is a plastic material such as acrylic.

21. The command module according to claim 17, wherein said material is a plastic material such as polycarbonate.

22. The command module according to claim 17, wherein said infrared light source is a xenon type flash tube.

23. The command module according to claim 17, wherein said remotely located device is a remotely located flash unit operative to emit flash light.

24. The command module according to claim 17, further comprising a test circuit and corresponding test operation switch to be operated to cause said test circuit to cause said infrared light source to emit infrared light independently of operations to be performed by the camera.

25. A command module for use with a camera to control a remotely located device, comprising:

an infrared light source; and a housing completely encasing said infrared light source and mounted to the camera, said housing being made from a material that transmits infrared light emitted by said infrared light source to an area outside said housing, said infrared light emitted by said infrared light source and transmitted by said housing controlling a remotely located device.

26. The command module according to claim 25, wherein said material is opaque to visible light.

27. The command module according to claim 25, wherein said material is made from transparent plastic mixed with a dye selected from the group consisting essentially of anthraquinone (red), anthraquinone (green), and perylene (yellow).

28. The command module according to claim 25, wherein said material is a plastic material such as acrylic.

29. The command module according to claim 25, wherein said material is a plastic material such as polycarbonate.

30. The command module according to claim 25, wherein said infrared light source is a xenon type flash tube.

31. The command module according to claim 25, wherein said remotely located device is a remotely located flash unit operative to emit flash light, said remotely located flash unit configured to be used during operations of the camera.

32. The command module according to claim 25, further comprising a test circuit and corresponding test operation switch to be operated to cause said test circuit to cause said infrared light source to emit infrared light independently of operations to be performed by the camera.

* * * * *